(12) United States Patent
Jeong et al.

(10) Patent No.: US 7,348,535 B2
(45) Date of Patent: Mar. 25, 2008

(54) METAL LINE STRUCTURE OF OPTICAL SCANNER AND METHOD OF FABRICATING THE SAME

(75) Inventors: Hyun-ku Jeong, Chungju-si (KR); Won-joo Kim, Suwon-si (KR); Young-chul Ko, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 118 days.

(21) Appl. No.: 11/354,014

(22) Filed: Feb. 15, 2006

(65) Prior Publication Data

US 2006/0232840 A1    Oct. 19, 2006

(30) Foreign Application Priority Data

Apr. 13, 2005    (KR)    ............ 10-2005-0030747

(51) Int. Cl.
*H01J 40/14* (2006.01)
*H01L 21/30* (2006.01)

(52) U.S. Cl. ................................ 250/216; 438/455
(58) Field of Classification Search ................ 250/234, 250/216, 239; 438/455, 470, 406; 359/17, 359/291, 198; 156/272.2; 257/432, 702–703
See application file for complete search history.

(56) References Cited

U.S. PATENT DOCUMENTS 7,153,758 B2 * 12/2006 Hata et al. ................ 438/455
7,192,841 B2 * 3/2007 Wei et al. ................. 438/455

* cited by examiner

*Primary Examiner*—Kevin Pyo
(74) *Attorney, Agent, or Firm*—Buchanan Ingersoll & Rooney PC

(57) ABSTRACT

A metal line structure of an optical scanner and a method of fabricating the same are provided. The metal line structure of the optical scanner includes: a glass substrate having a metal line region etched to a predetermined depth; a metal line formed in the metal line region; a diffusion barrier layer that is formed on the glass substrate and covers the metal line; and an optical scanner structure combined with the glass substrate.

8 Claims, 6 Drawing Sheets

METAL LINE STRUCTURE OF OPTICAL SCANNER AND METHOD OF FABRICATING THE SAME

CROSS-REFERENCE TO RELATED PATENT APPLICATIONS

This application claims the benefit of Korean Patent Application No. 10-2005-0030747, filed on Apr. 13, 2005, in the Korean Intellectual Property Office, the disclosure of which is being incorporated herein in its entirety by reference.

BACKGROUND OF THE DISCLOSURE

1. Field of the Disclosure

The present disclosure relates to a metal line structure of an optical scanner and a method of fabricating the same.

2. Description of the Related Art

Micro actuators having a micro electro mechanical system (MEMS) structure which uses an electrostatic effect caused by a comb type electrode are used to form an optical scanner that scans a laser beam in a projection TV.

FIG. 1 is a perspective view of a microscanner 100 having a double comb structure that is disclosed in Korean Patent Application No. 2004-0059114, and FIG. 2 is a cross-sectional view of the microscanner 100 illustrated in FIG. 1.

Referring to FIGS. 1 and 2, the microscanner 100 includes a stage 12 having a mirror surface 12a thereon, upper and lower substrates 20 and 10 respectively spaced apart from upper and lower portions of the stage 12, and a supporting portion which supports the sides of the stage 12 so that the stage 12 can be suspended between the upper and lower substrates 20 and 10. A plurality of driving comb electrodes 14a and 14b are provided so as to be perpendicular to each other while being spaced apart from each other by a predetermined distance at the sides of the stage 12. A plurality of upper fixed comb electrodes 21a and 21b and a plurality of lower fixed comb electrodes 11a and 11b are disposed on the upper substrate 20 and the lower substrate 10, respectively, so that they are alternately formed in a zigzag pattern with the driving comb electrodes 14a and 14b.

The supporting portion includes a rectangular fixed frame 16 and a torsion spring 13. The fixed frame 16 is formed on the lower substrate 10 to surround the stage 12, and the torsion spring 13 connects the fixed frame 16 and the stage 12.

A fixed frame 26 corresponding to the fixed frame 16 is connected to a lower surface of the upper substrate 20. The fixed frames 16 and 26 are connected to each other by an adhesive layer 28 interposed therebetween. The fixed frames 16 and 26 include conductive layers 16a, 16c, 26a, and 26c and insulating layers 16b and 26b formed between the conductive layers 16a, 16c, 26a, and 26c, respectively.

The conductive layer 16a transmits voltages applied to a metal line and electrode pads 18a and 18b disposed on the lower substrate 10 to lower fixed comb electrodes 11a and 11b, respectively. An electrode pad 19 is disposed above the conductive layer 16c. A voltage applied to the electrode pad 19 is transmitted to the driving comb electrodes 14a and 14b via the conductive layer 16b and the torsion spring 13.

An opening 25 may be formed in the upper substrate 20 corresponding to the stage 12 so that the stage 12 can be exposed to the outside. Through holes 22a and 22b are formed at left and right sides of the opening 25 of the upper substrate 20, and electrode pads 24a and 24b are formed on the top surface of the upper substrate 20 passing the through holes 22a and 22b.

The electrode pads 24a and 24b are connected to the fixed frame 26a formed on the upper substrate 20. Thus, the voltages applied to the electrode pads 24a and 24b are transmitted to the fixed comb electrodes 21a and 21b, respectively, via the fixed frame 26a.

FIGS. 3A through 3E are cross-sectional views for explaining a method of fabricating a lower structure of an optical scanner of FIGS. 1 and 2.

Referring to FIG. 3A, Pyrex glass 10 is etched to form a metal line region having a predetermined depth. Subsequently, a Cr layer and an Au layer are sequentially deposited to a thickness of 300/4000 Å and are patterned, thereby forming metal lines 18a and 18b.

Referring to FIG. 3B, a silicon on insulator (SOI) substrate having an $SiO_2$ insulating layer 16b formed to a thickness of 1-2 μm between a first silicon layer 16a and a second silicon layer 16c is prepared. The insulating layer 16b is used as an etch stop. The first silicon layer 16a is etched, thereby forming a portion of a rectangular fixed frame 16 and fixed comb electrodes 11a and 11b.

Referring to FIG. 3C, the etched first silicon layer 16a is anodic bonded on the glass substrate 10 of FIG. 3A. In this case, the glass substrate 10 is maintained at a pressure of 800 N at 380° C. and in a vacuum atmosphere of 0.05 Torr for 4 minutes.

Referring to FIG. 3D, a mask (not shown) is formed on the second silicon layer 16c at a region for a stage 12, driving comb electrodes 14a and 14b, and a torsion spring 13 and then, a portion that is not covered by the mask is etched using inductively coupled plasma reactive ion etching (ICPRIE), so that the insulating layer 16b is exposed via an exposed region of the mask.

Referring to FIG. 3E, the exposed insulating layer 16b is removed by performing wet etching using a sulfuric acid solution and a BOE solution. Subsequently, a mirror surface 12a having 99% or more reflectivity is formed on a top surface of the stage 12 so as to minimize damage caused by a laser beam for an optical scanner.

In the metal lines 18a and 18b, hillocks are generated when Au is dispersed into the first silicon layer 16a during the anodic bonding, and further, the metal lines 18a and 18b may be broken. FIG. 4 is a photo showing hillocks generated during the anodic bonding. In addition, during a process of removing the insulating layer 16b illustrated in FIG. 3E, Au may be deposited by chemical reaction.

SUMMARY OF THE DISCLOSURE

The present invention may provide a metal line structure of an optical scanner in which a metal line is not exposed during anodic bonding and chemical etching.

The present invention also may provide a method of fabricating a metal line structure of an optical scanner by which a metal line is prevented from being broken during anodic bonding and chemical etching.

According to an aspect of the present invention, there may be provided a metal line structure of an optical scanner, the metal line structure of the optical scanner including: a glass substrate having a metal line region etched to a predetermined depth; a metal line formed in the metal line region; a diffusion barrier layer that is formed on the glass substrate and covers the metal line; and an optical scanner structure combined with the glass substrate.

A lower portion of the optical scanner structure may be formed of silicon and the optical scanner structure may be anodic bonded to the glass substrate.

The diffusion barrier layer may be formed of a material selected from the group consisting of TiN, TaN, Ti, Pt, TiW, and Ni.

The diffusion barrier layer may be formed to a thickness of 500-2000 Å.

According to another aspect of the present invention, there is provided a method of fabricating a metal line structure of an optical scanner, the method including: patterning a metal line region on a glass substrate to a predetermined depth; forming a metal line in the metal line region; forming a diffusion barrier layer that covers the metal line, on the glass substrate; and anodic bonding an optical scanner structure having a lower portion formed of silicon to the glass substrate.

BRIEF DESCRIPTION OF THE DRAWINGS

The above and other aspects of the present invention will be apparent from detailed exemplary embodiments thereof with reference to the attached drawings in which.

DETAILED DESCRIPTION OF EXEMPLARY EMBODIMENTS

Figure 1:
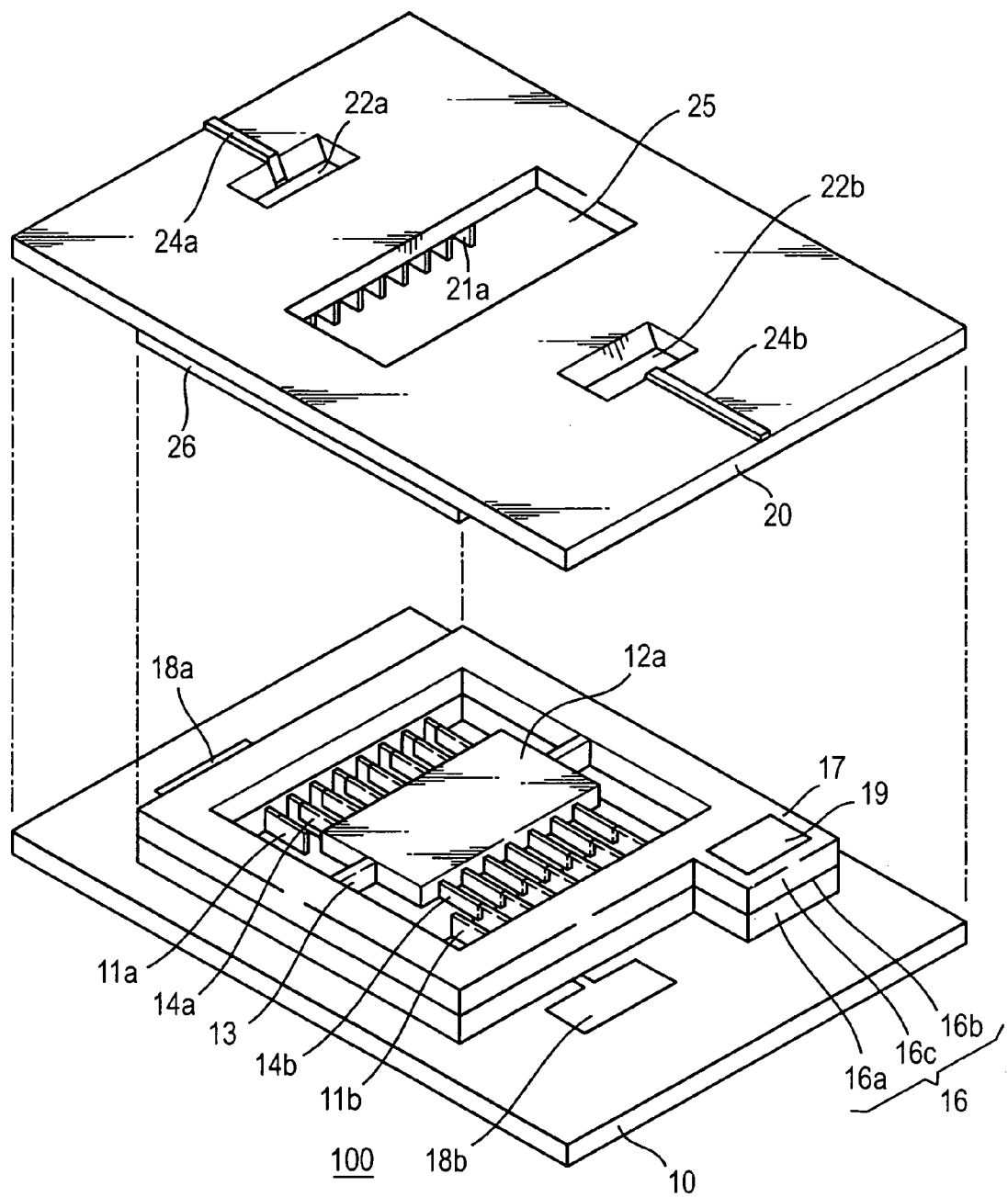
FIG. 1 is a perspective view of a microscanner having a double comb structure disclosed in Korean Patent Application No. 2004-0059114.
Figure 2:
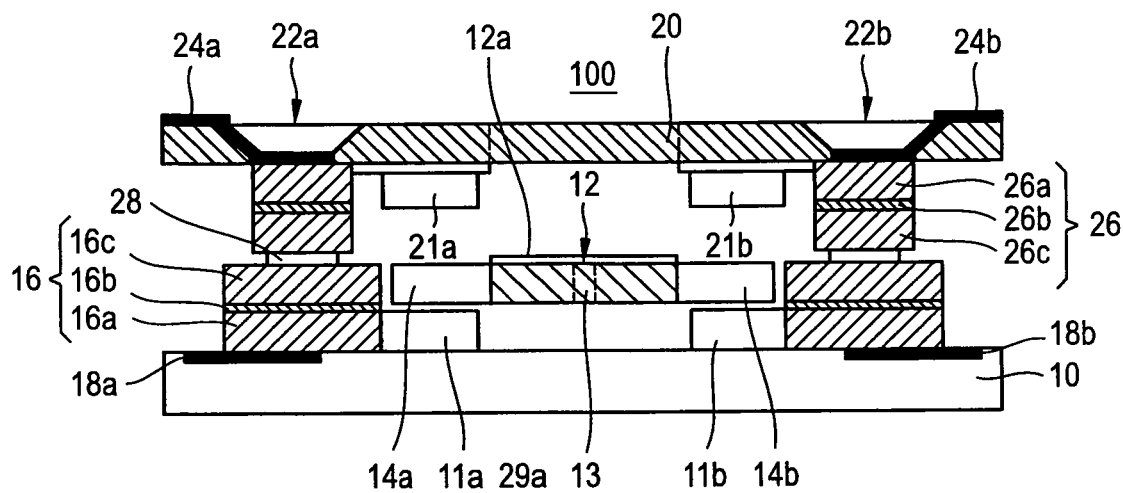
FIG. 2 is a cross-sectional view of the microscanner illustrated in FIG. 1.
Figure 3A:
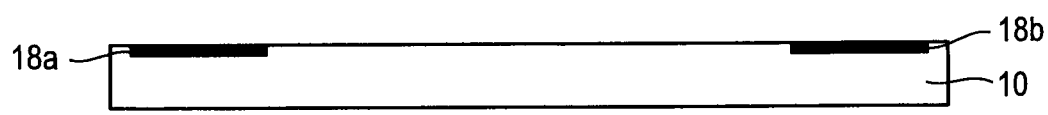
FIGS. 3A through 3E are cross-sectional views for showing a method of fabricating a lower structure of an optical scanner of FIGS. 1 and 2.
Figure 3B:
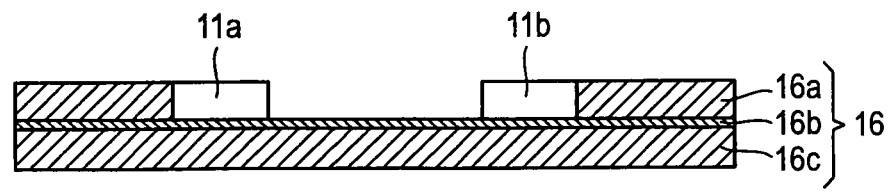
Figure 3C:
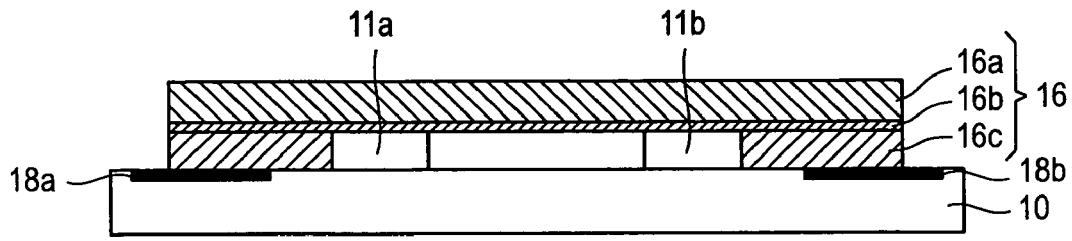
Figure 3D:
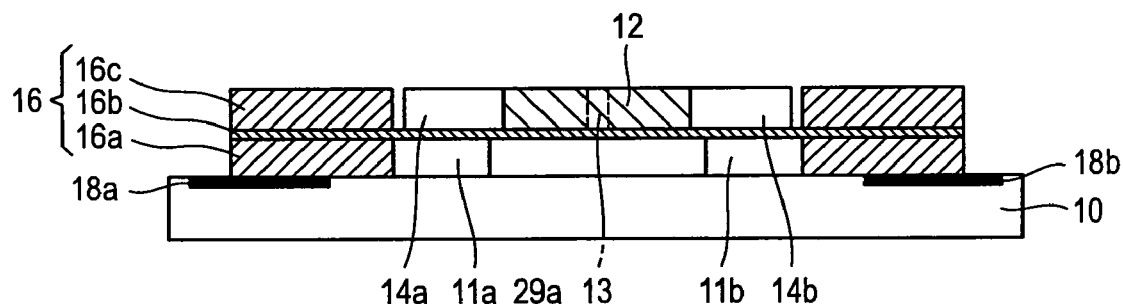
Figure 3E:
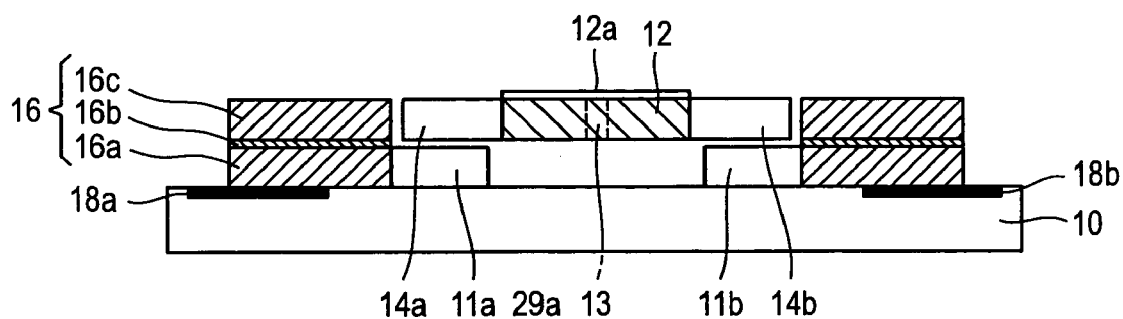
Figure 4:
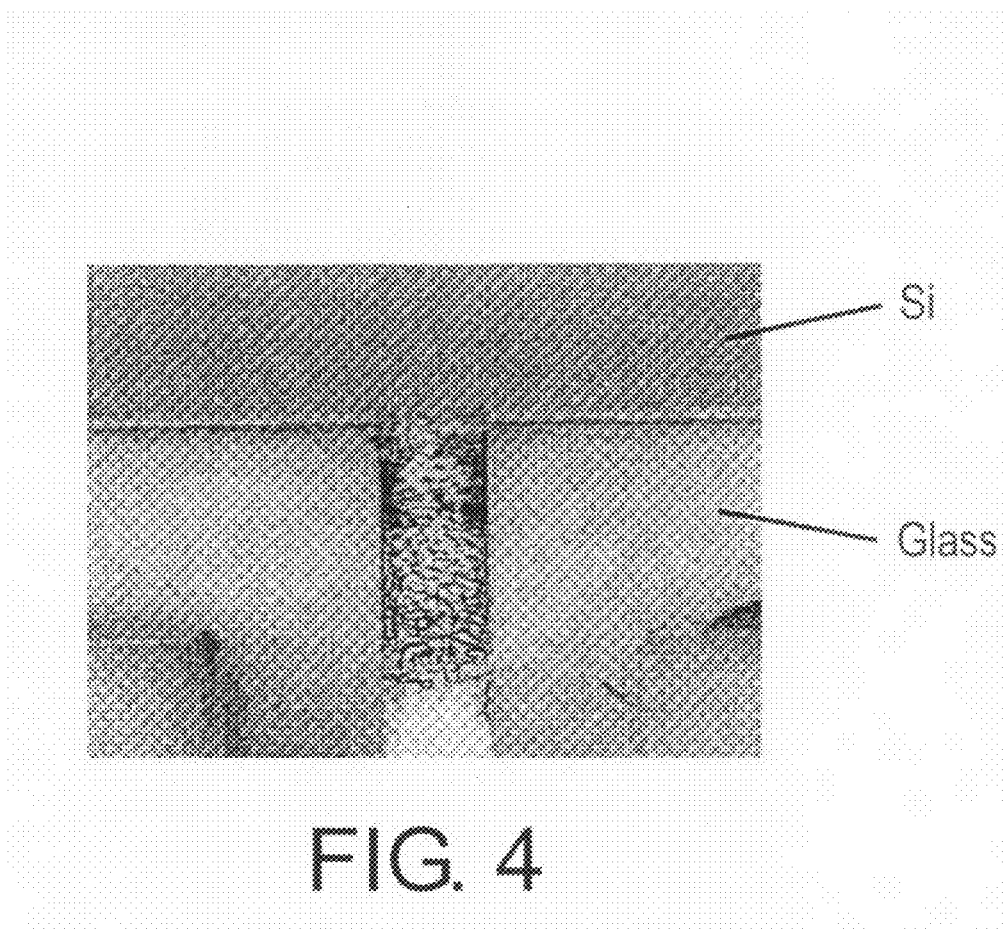
FIG. 4 is a photo showing hillocks generated during anodic bonding.
Figure 5:
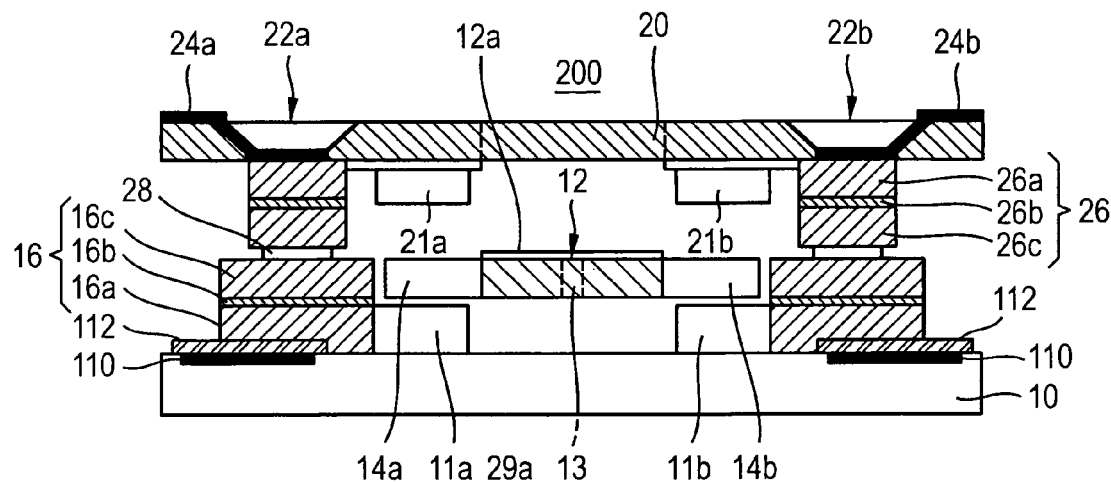
FIG. 5 is a cross-sectional view of a metal line structure of an optical scanner according to an embodiment of the present invention.

FIG. 5 is a cross-sectional view of an optical scanner 200 according to an embodiment of the present invention. Like reference numerals in FIGS. 1 and 2 and 5 denote like elements, and a detailed description thereof is being omitted.

Referring to FIG. 5, partial regions of the glass substrate 10 are etched to a predetermined depth, for example, 5000 Å, and a metal line 110 is formed in the etched regions. The metal line 110 may be formed of a Cr/Au layer to a thickness of 300/4000 Å.

In addition, a diffusion barrier layer 112 that covers the metal line 110 is formed on the glass substrate 10. The diffusion barrier layer 112 may be formed to a thickness of about 500-2000 Å. The diffusion barrier layer 112 is formed of a material used to prevent Au of the metal line 110 from being diffused into a silicon layer during anodic bonding and to prevent the metal line 110 from being broken during chemical etching. The diffusion barrier layer 112 may be a conductive layer formed of a material, such as, TiN, TaN, Ti, Pt, TiW, and Ti. The material used to form the diffusion barrier layer 112 protects an Au layer of the metal lines 110 during chemical etching and is stable even at an anodic bonding temperature.

The diffusion barrier layers 112 are connected to an external electrode pad, so as to apply power to a silicon layer 16a and fixed comb electrodes 11a and 11b.

When the silicon layer 16a is anodic bonded to the glass substrate 10, Au formed below the diffusion barrier layer 112 is prevented from being diffused into the silicon layer 16a. Thus, the metal line 110 is prevented from being broken. In addition, since a major portion of the diffusion barrier layer 112 is protected during a process of removing the insulating layer 16b which is a chemical etching process, the metal line 110 is prevented from being broken.

FIGS. 6A through 6F are schematic cross-sectional views for showing a method of fabricating a lower structure of an optical scanner of FIG. 5, according to an embodiment of the present invention.

Figure 6A:
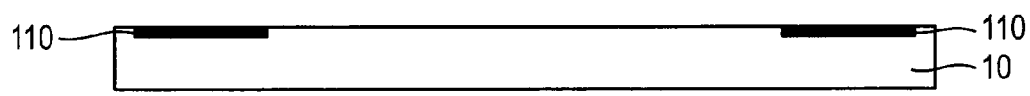
FIGS. 6A through 6F are schematic cross-sectional views showing a method of fabricating a lower structure of an optical scanner of FIG. 5, according to an embodiment of the present invention.

Referring to FIG. 6A, Pyrex glass 10 is etched to form a metal line region having a predetermined depth, for example, 5000 Å. Subsequently, a Cr layer and an Au layer are sequentially deposited to a thickness of 300/4000 Å on the glass 10 and then are patterned, thereby forming metal lines 110.

Figure 6B:
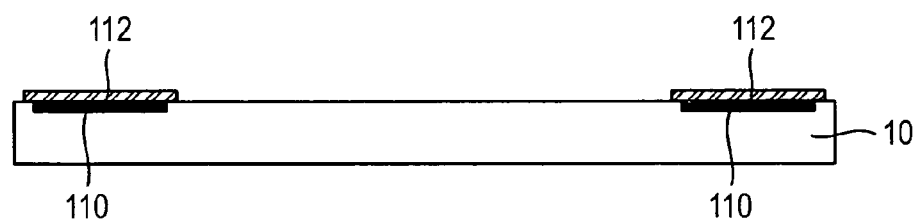

Referring to FIG. 6B, a metal layer having a thickness of about 500-2000 Å, for example, a metal layer formed of a material selected from TiN, TaN, Ti, Pt, TiW, and Ni, is deposited on the metal line 110. Subsequently, the metal layer is patterned, thereby forming a diffusion barrier layer 112 that covers the metal lines 110.

Figure 6C:
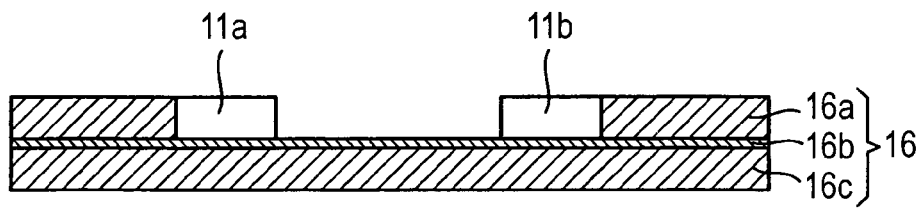

Referring to FIG. 6C, a silicon on insulator (SOI) substrate having an SiO2 insulating layer 16b is formed to a thickness of 1-2 μm between a first silicon layer 16a and a second silicon layer 16c is prepared. The insulating layer 16b is used as an etch stop. The first silicon layer 16a is etched, thereby forming a portion of a rectangular fixed frame 16 and fixed comb electrodes 11a and 11b.

Figure 6D:
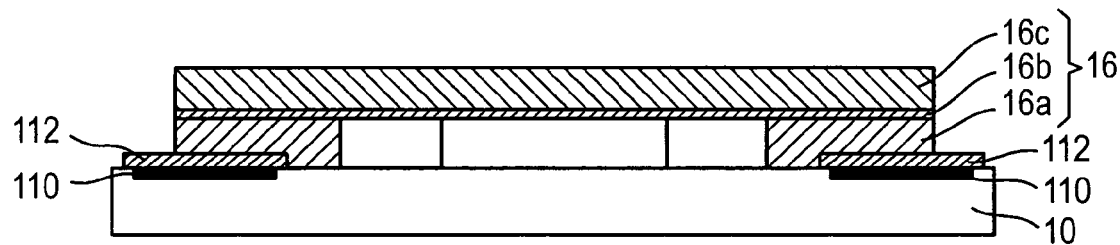

Referring to FIG. 6D, the etched first silicon layer 16a is anodic bonded on the glass substrate 10 of FIG. 6B. In this case, the glass substrate 10 is maintained at a pressure of 800 N at 380° C. and in a vacuum atmosphere of 0.05 Torr for 4 minutes.

Figure 6E:
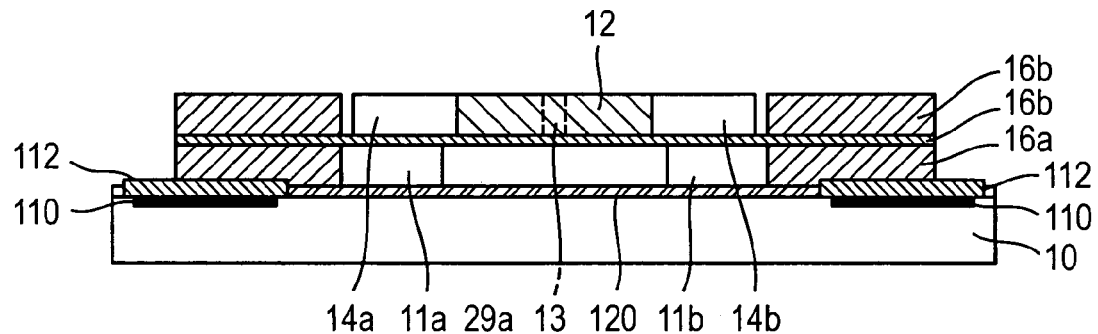

Referring to FIG. 6E, a mask (not shown) is formed on the second silicon layer 16c at a region for a stage 12, driving comb electrodes 14a and 14b, and a torsion spring 13 of a supporting shaft, and then, a portion that is not covered by the mask is etched using inductively coupled plasma reactive ion etching (ICPRIE), so that an insulating layer 16b is exposed via an exposed region of the mask.

Figure 6F:
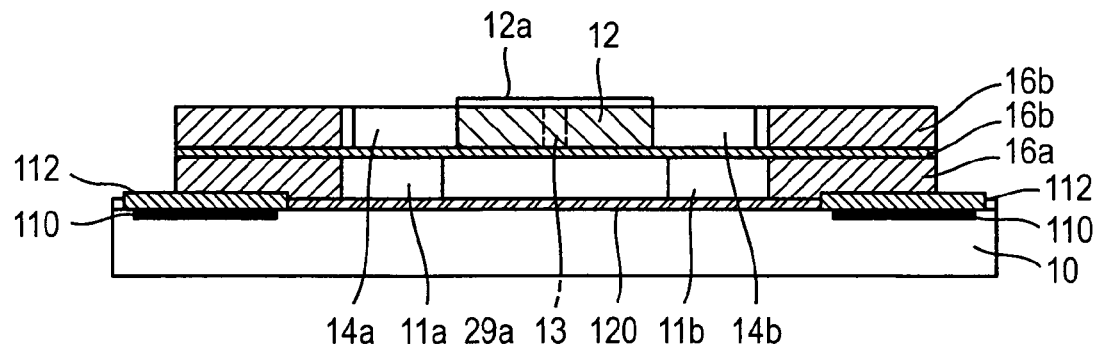

Referring to FIG. 6F, the exposed insulating layer 16b is removed by performing wet etching using a sulfuric acid solution and a BOE solution. Subsequently, a mirror surface 12a having 99% or more reflectivity is formed on a top surface of the stage 12 so as to minimize damage caused by a laser beam for an optical scanner.

In the metal structure having the diffusion barrier layer, the diffusion barrier layer 112 prevents Au from being diffused into the silicon layer during anodic bonding. Thus, the metal lines 110 are prevented from being broken caused by the hillocks. In addition, when the insulating layer 16b is chemically etched, an etchant is prevented from eroding into the metal line 110, and the metal lines 110 are prevented from being broken.

As described above, in the metal line structure of the optical scanner and the method of fabricating the same according to the present invention, the metal line is protected by the diffusion barrier layer during anodic bonding and chemical etching such that the metal line is prevented from being broken. Thus, the production yield of the optical scanner is increased, and the reliability thereof is improved.

While the present invention has been particularly shown and described with reference to exemplary embodiments thereof, it will be understood by those skilled in the art that various changes in form and details may be made therein without departing from the spirit and scope of the invention as defined by the following claims.

What is claimed is:

1. A metal line structure of an optical scanner comprising:
    a glass substrate having a metal line region etched to a predetermined depth;
    a metal line formed in the metal line region;
    a diffusion barrier layer that is formed on the glass substrate and covers the metal line; and
    an optical scanner structure combined with the glass substrate.

2. The metal line structure of the optical scanner of claim 1, wherein a lower portion of the optical scanner structure is formed of silicon and the optical scanner structure is anodic bonded to the glass substrate.

3. The metal line structure of the optical scanner of claim 1, wherein the diffusion barrier layer is formed of a material selected from a group consisting from the group of TiN, TaN, Ti, Pt, TiW, and Ni.

4. The metal line structure of the optical scanner of 1, wherein the diffusion barrier layer is formed to a thickness of about 500-2000 Å.

5. A method of fabricating a metal line structure of an optical scanner, the method comprising:
    patterning a metal line region on a glass substrate to a predetermined depth;
    forming a metal line in the metal line region;
    forming a diffusion barrier layer that covers the metal line, on the glass substrate; and
    anodic bonding an optical scanner structure having a lower portion formed of silicon to the glass substrate.

6. The method of claim 5, wherein the metal line is formed by sequentially forming a Cr layer and an Au layer.

7. The method of claim 5, wherein the diffusion barrier layer is formed of a material selected from a group consisting of TiN, TaN, Ti, Pt, TiW, and Ni.

8. The method of claim 6, wherein the diffusion barrier layer is formed to a thickness of about 500-2000 Å.

* * * * *